United States Patent [19]
Nash

[11] Patent Number: 5,509,560
[45] Date of Patent: Apr. 23, 1996

[54] GANGABLE PLASTIC BOX FOR ELECTRICAL OUTLETS

[76] Inventor: William L. Nash, 4069 NE. 8 Ave., Oakland Park, Fla. 33334

[21] Appl. No.: 457,020

[22] Filed: Jun. 1, 1995

[51] Int. Cl.⁶ .................................................... H02G 3/08
[52] U.S. Cl. ............................ 220/3.9; 220/3.94; 174/53; 174/57
[58] Field of Search .......................... 220/3.2, 3.9, 3.92, 220/3.94; 174/53, 57

[56] References Cited

U.S. PATENT DOCUMENTS

| | | |
|---|---|---|
| 2,297,862 | 10/1942 | Bachmann ......................... 220/3.94 X |
| 3,474,994 | 10/1969 | Swanquist ............................ 220/3.9 X |
| 4,044,909 | 8/1977 | Amsier et al. . |
| 4,111,328 | 9/1978 | Eggert et al. . |
| 4,135,337 | 1/1979 | Medlin . |
| 4,428,492 | 1/1984 | Jorgensen . |
| 4,673,097 | 6/1987 | Schuldt . |
| 4,747,506 | 5/1988 | Stuchlik, III ............................ 220/3.9 |
| 4,958,048 | 9/1990 | Bell ........................................ 174/57 X |
| 5,223,673 | 6/1993 | Mason .................................... 174/53 |
| 5,378,854 | 1/1995 | Hoover . |

*Primary Examiner*—Steven M. Pollard
*Attorney, Agent, or Firm*—Herbert L. Lerner; Laurence A. Greenberg

[57] ABSTRACT

A multi-gangable outlet box is assembled from one or more main housing elements and two lateral members, which close off the sides of the outlet box. The individual members are connected to one another by engaging snap latches with corresponding receiving slots. The snap latches and the slots are disposed diagonally across one another on the main housing element. If the main housing member is rotated by 180°, therefore, the same configuration of tabs and slots results.

6 Claims, 4 Drawing Sheets

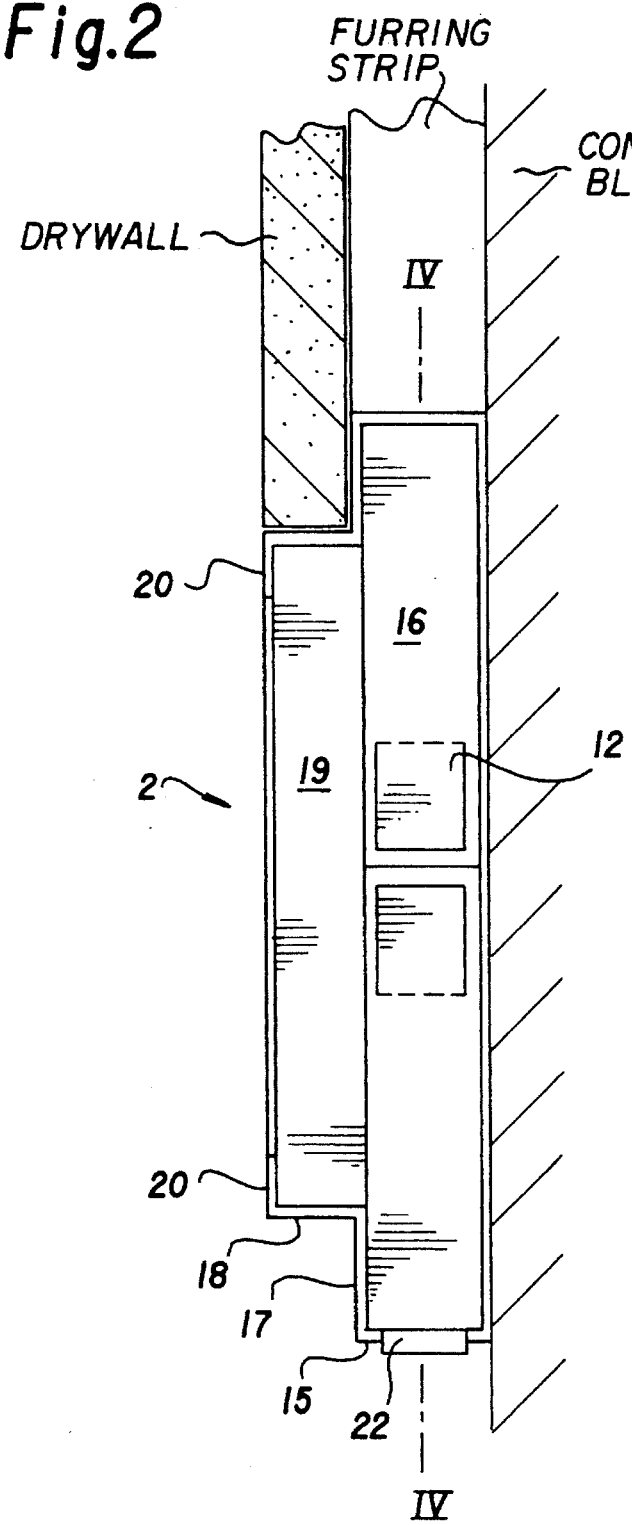
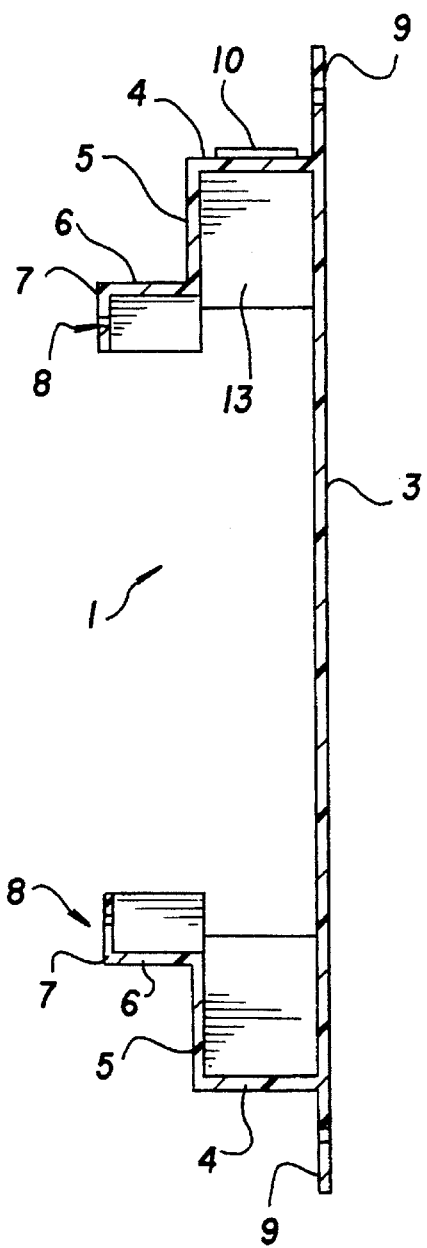

GANGABLE PLASTIC BOX FOR ELECTRICAL OUTLETS

BACKGROUND OF THE INVENTION

1. Field of the Invention

The invention relates to an outlet box for electrical outlets. The outlet box is mounted on concrete block walls between furring strips for mounting thereon drywall or sheetrock. The box, at its lateral openings, receives non-metallic jacketed cable.

2. Description of the Related Art

Plastic outlet boxes which are currently available in commerce are a minimum of 2" to 3½ (5.1–8.9 cm) deep. The furring strips, which define the distance between the concrete wall and the drywall finish, generally have a thickness of only ¾ (1.9 cm). Accordingly, it is necessary to chisel recesses or holes from the concrete block, so as to allow proper placement of the outlet box. The object is to align the outer flange of the outlet box with the outer surface of the drywall finish and to extend only those parts of the box out beyond the furring strips which will extend through the drywall. After the box has been properly mounted the concrete wall is patched around the box to fill void in the concrete block.

Additionally, depending on the location of placement of the outlet box, it is necessary to provide a box for a single outlet, for two outlets (double socket or light switch and socket), or for more. It has therefore been necessary for the electrical contractor to carry a wide variety of differently sized, normed outlet boxes for single or for multi-outlet application.

U.S. Pat. No. 5,378,854 to Hoover discloses a plastic box formed essentially of two components, namely a housing body and a side wall member. Two of the housing bodies may be combined to form a double outlet. If a single outlet is desired, the side of the housing body may be closed off with the side wall member. The outlet box taught by Hoover is a box for attachment to a stud, which is much deeper than furring strips. Hoover's box is gangable only up to a dual outlet box and, if utilized in the context of furred walls, it is so deep as to require the above-described chipping of a void in the concrete block.

A gangable outlet box housing is disclosed in U.S. Pat. No. 4,428,492 to Jorgensen. The box is also formed of two components, namely a central housing body and a side wall member. The central housing body may be ganged multiple times by matching male members of the one unit with female members of the other unit. Jorgensen's box is also a box body for use with stud walls and, in the context of furred walls, therefore, it is necessary to chip into the concrete block, to place the box and to plaster back the voids.

SUMMARY OF THE INVENTION

It is accordingly an object of the invention to provide a gangable plastic box for electrical outlets, which overcomes the above-mentioned disadvantages of the heretofore-known devices and methods of this general type and which makes it possible to avoid breaking out concrete block and to plaster the voids when outlet boxes are installed to code. At the same time, it is another object to provide a gangable box so as to reduce manufacturing and inventory problems.

With the foregoing and other objects in view there is provided, in accordance with the invention, an electrical outlet box assembly, comprising:

a main housing member and a lateral member adapted to be connected to the main housing member;

the main housing member being formed of a generally flat, rectangular backplate with relatively longer sides and relatively shorter sides; a mounting tab connected to the backplate in a substantially coplanar relationship therewith; first sidewalls respectively formed on each of the relatively shorter sides of the backplate and orthogonally extending away from the backplate; drywall support surfaces respectively formed on each of the first sidewalls distally from the backplate and extending substantially parallel to the backplate; second side walls respectively formed on each of the support surfaces distally from and extending substantially parallel to the first sidewall; and support flanges respectively formed on each of the second sidewalls and having mounting holes formed therein for mounting an electrical device;

the lateral member having a backwall, first sidewalls, and additional walls corresponding to the main housing member such that, when the lateral member is placed laterally against one of the longer sides of the main housing member, the main housing member and the lateral member together define an electrical outlet box with a forward opening for receiving an electrical device;

each of the first sidewalls of the main housing component having a snap latch receiving slot formed therein diagonally across from one another as seen relative to the rectangular backplate, and a snap latch molded thereon diagonally across from one another and opposite the snap latch receiving slot; and one of the first sidewalls of the lateral member having a snap latch formed thereon for mating with one of the snap latch receiving slots of the main housing component, and the other of the first sidewalls of the lateral member having a snap latch receiving slot formed therein for mating with one of the snap latches of the main housing member when the main housing member and the lateral member are placed against one another.

In accordance with an added feature of the invention, the mounting tab is integrally formed with the backplate.

In accordance with an additional feature of the invention, the main housing member is integrally formed of injection-molded PVC. Suitable PVCs are those which are UL (Underwriter's Laboratory) approved. The lateral member is also integrally formed of injection-molded PVC.

In accordance with another feature of the invention, the first sidewalls of the main housing member and of the lateral member have butterfly tabs formed thereon for allowing the introduction of electrical wire into the outlet box.

In accordance with a concomitant feature of the invention, the outlet box is adapted to be placed on concrete block between furring strips used for spacing drywall finish from the concrete block, and the outlet box has a given depth defined from the backplate to the support flange, the given depth corresponding to a sum of a thickness of the furring strips and of the drywall finish.

One main housing member together with two lateral members, therefore, make up a single outlet box. Two or more main housing members together with two lateral members make up a dual or multi outlet box.

Other features which are considered as characteristic for the invention are set forth in the appended claims.

Although the invention is illustrated and described herein as embodied in a gangable plastic box for electrical outlets, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

BRIEF OF THE DRAWINGS

FIG. 2 is a side-elevational view of a lateral member of the outlet box;

FIG. 3 is a longitudinal section taken centrally through a main housing member of the outlet box;

DESCRIPTION OF THE PREFERRED EMBODIMENTS

Figure 1:
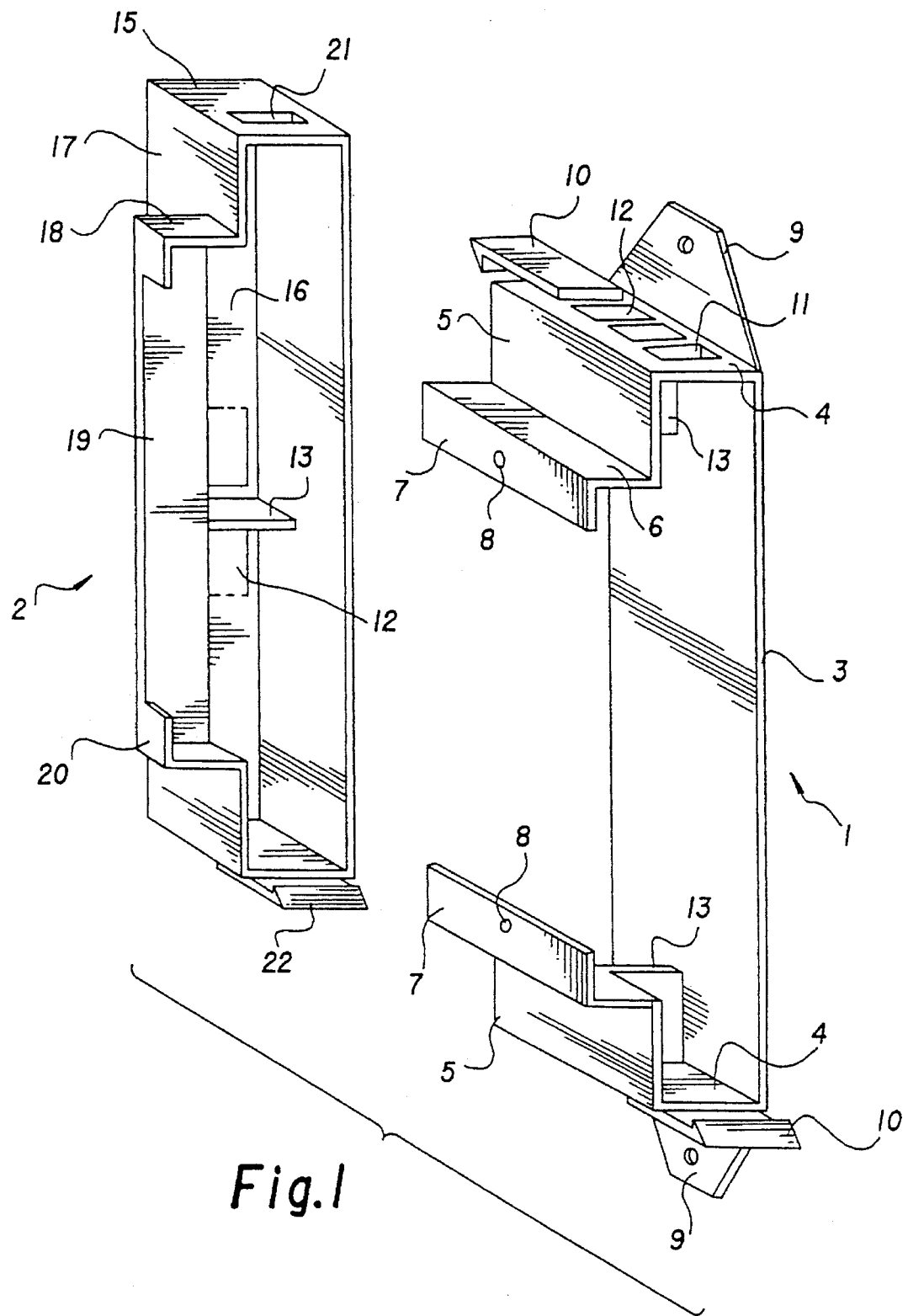
FIG. 1 is an exploded, front top perspective view of two components of a gangable outlet box.
Figure 4:
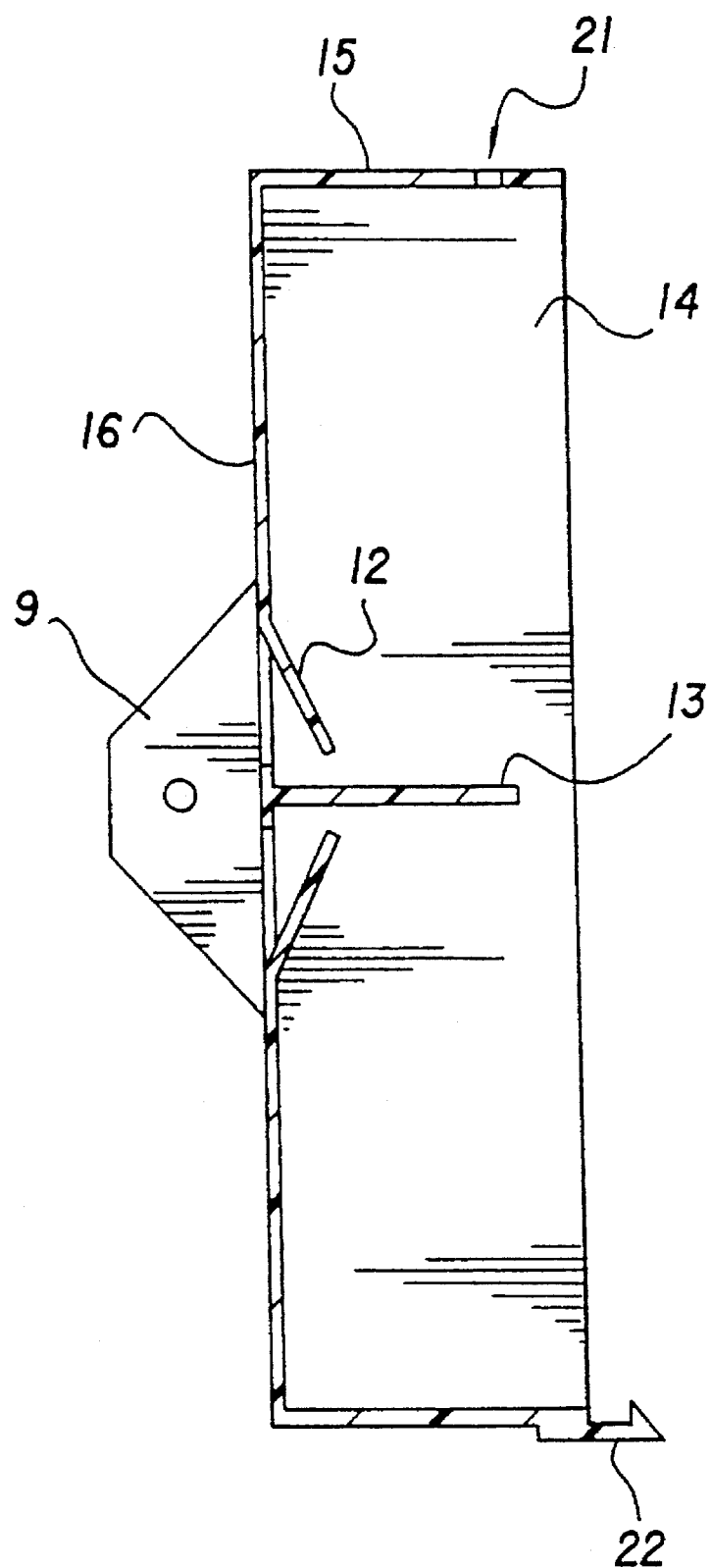
FIG. 4 is a longitudinal section taken along the line IV—IV of FIG. 2.
Figure 6:
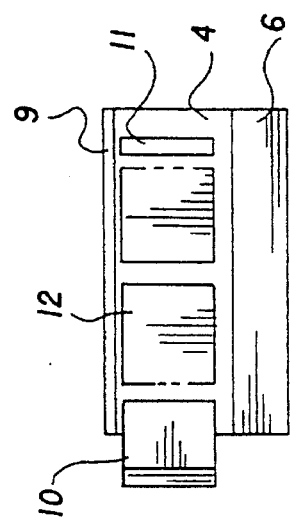
FIG. 6 is a top-plan view of the main housing member.
Figure 5:
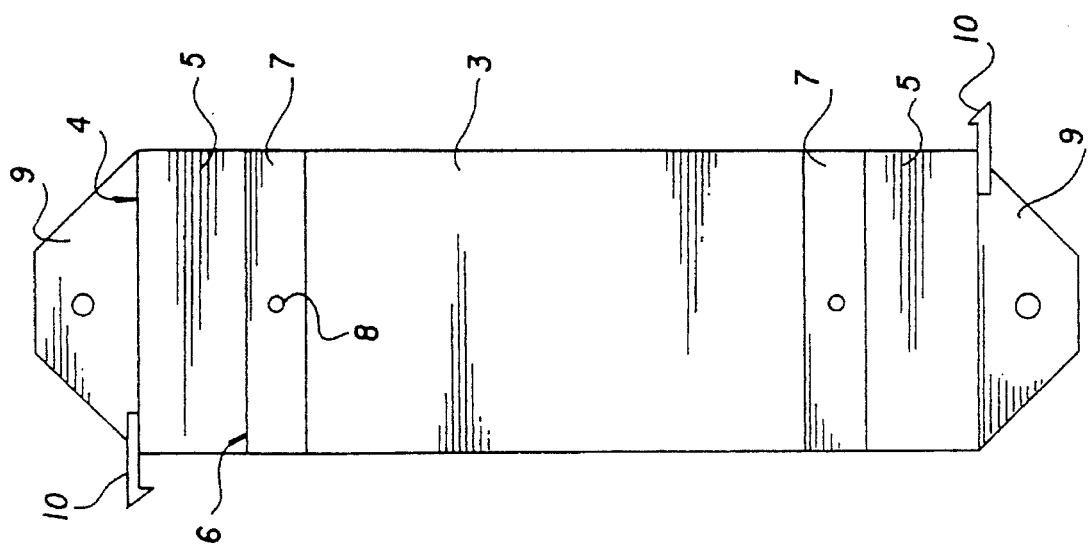
FIG. 5 is a front-elevational view of the main housing member.

Referring now to the figures of the drawing in detail and first, particularly, to FIG. 1 thereof, there is seen a main housing member 1 and a lateral member 2. A single outlet box is formed by snapping one lateral member 2 on each side of the main housing member 1. Multiple outlets are formed by ganging several main housing members 1. Both housing members 1 and 2 are preferably integrally formed of injection molded UL approved PVC.

The main housing member 1 has a backplate or a backwall 3 to be placed against a non-illustrated concrete wall. The backplate 3 is generally flat and rectangular, i.e. with relatively shorter sides and relatively longer sides. At the top and at the bottom (as seen in a vertical orientation of the outlet) there are formed on respective double L brackets. The double L brackets are formed of a first sidewall 4 (oriented perpendicularly away from the backwall 3), a drywall support surface 5 (oriented perpendicularly away from the first sidewall 4, towards the middle of the outlet box, and parallel to the backwall 3), a second sidewall 6 (oriented parallel to the first sidewall 4), and a support flange 7 for a non-illustrated electrical device. Each of the bottom and top support flanges 7 is provided with a threaded device mounting hole 8 for receiving a device mounting screw.

The support surface 5, while referred to as a "drywall" support surface, defines the support surface upon which any wall finishing structure may be disposed.

The width of the first sidewall 4 corresponds to the thickness of the furring strips with which the box is to be used. The width of the drywall support surface 5 must chosen such that the device mounting holes 8 are correctly spaced from one another. According to typical U.S. norm, the spacing between the screws is 3¼ (8.25 cm). The spacing between the mutually facing edges of the drywall support surfaces 7 should be chosen so as to provide sufficient spacing for receiving the electrical device.

Mounting tabs 9 are integrally formed onto the backwall 3 such that they are flush therewith and they extend vertically outwardly from the box.

Snap latches 10 are formed on diagonally opposite corners of the main housing member 1 and slots 11 are formed in the first side wall 4 at the other two of the diagonally opposite corners. When two similar components are attached to one another, the snap latch 10 of one of the components engages in the slot 11 of the other, while the snap latch 10 of the other component engages in the slot 11 of the one component. The orientation is thereby of no import, because the snap latches 10 and the slots 11 are disposed mutually diagonally across from one another.

Butterfly tabs 12, i.e. bend tabs, are provided in each of the first sidewalls 4. The butterfly tabs 12 are essentially weakened flaps through which cable (e.g. Romex cable) is inserted into the box when it is installed on location.

Reinforcing dividers 13 or webs 13 are disposed at the entry location of the double butterfly tabs 12. The webs 13 are formed on the backwall 3 and on the support surface 5.

The lateral member 2 is formed such that, when it is laterally placed against the longer side of the main housing member 1, all of the sidewalls and support surfaces meet to form a largely closed outlet box. Placing one lateral member 2 on either side of the main housing member 1, leads to a single device outlet box. Placing two main housing members 1 laterally against one another (and engaging the mating snap latches and snap latch slots) and then closing the open sides with two lateral members 2 will lead to a double outlet box for two electrical devices. The box is therefore gangable to any number of outlets, while the manufacturing and on-the-job inventory is limited to only two components.

The lateral member 2 is formed with a backwall 14 and a first sidewall 15 on both of its short sides. One of the long sides is closed off with an end wall 16. The sidewalls 15 and the end wall 16 meet at the corners and they are joined to a support surface 17, which corresponds to the support surface 5 of the main housing member 1 (when the two members 1 and 2 are connected). A second sidewall 18 and a second end wall 19 define a forward box opening together with the second sidewall 6 of the main housing member 1. A support flange 20 may be provided to add stability to the assembly.

The assembly is further stabilized by the reinforcing webs 13 disposed between the butterfly tabs 12 in the lateral end wall 16.

The depth of the entire box, as defined from the back surface of the backplate 3 to the support flange 7 is defined by the summed thicknesses of the furring strip and the wall finish. In the preferred application, the depth is 1¼ (3.175 cm), whereby the first sidewalls 4 and 15 are ¾ (1.9 cm) thick and the second sidewalls 6 and 18 correspond to the thickness of the wall finish, i.e. ½ (1.27 cm). The box can also be used with ⅝ (1.59 cm) drywall.

I claim:

1. An electrical outlet box assembly, comprising:

a main housing member and a lateral member adapted to be connected to said main housing member;

said main housing member being formed of a generally flat, rectangular backplate with relatively longer sides and relatively shorter sides; a mounting tab connected to said backplate in a substantially coplanar relationship therewith; first sidewalls respectively formed on each of said relatively shorter sides of said backplate and orthogonally extending away from said backplate; drywall support surfaces respectively formed on each of said first sidewalls distally from said backplate and extending substantially parallel to said backplate; second side walls respectively formed on each of said support surfaces distally from and extending substantially parallel to said first sidewall; and support flanges respectively formed on each of said second sidewalls and having mounting holes formed therein for mounting an electrical device;

said lateral member having a backwall, first sidewalls, and additional walls corresponding to said main housing member such that, when said lateral member is placed laterally against one of said longer sides of said main housing member, said main housing member and said lateral member together define an electrical outlet box with a forward opening for receiving an electrical device;

each of said first sidewalls of said main housing component having a snap latch receiving slot formed therein diagonally across from one another as seen relative to said rectangular backplate, and a snap latch molded thereon diagonally across from one another and opposite said snap latch receiving slot; and one of said first sidewalls of said lateral member having a snap latch formed thereon for mating with one of said snap latch receiving slots of said main housing component, and the other of said first sidewalls of said lateral member having a snap latch receiving slot formed therein for mating with one of said snap latches of said main housing member when said main housing member and said lateral member are placed against one another.

2. The outlet box according to claim 1, wherein said mounting tab is integrally formed with said backplate.

3. The outlet box according to claim 1, wherein said main housing member is integrally formed of injection-molded PVC.

4. The outlet box according to claim 1, wherein said lateral member is integrally formed of injection-molded PVC.

5. The outlet box according to claim 1, wherein said first sidewalls of said main housing member and of said lateral member have butteryfly tabs formed thereon for selectively introducing electrical wire into the outlet box.

6. The outlet box according to claim 1, wherein the outlet box is adapted to be placed on concrete block between furring strips used for spacing drywall finish from the concrete block, and the outlet box has a given depth defined from said backplate to said support flange, said given depth corresponding to a sum of a thickness of the furring strips and of the drywall finish.

\* \* \* \* \*